(12) United States Patent
Liu et al.

(10) Patent No.: US 7,969,114 B2
(45) Date of Patent: Jun. 28, 2011

(54) MOTOR DRIVING SYSTEM COMPATIBLE WITH DIFFERENT TYPES OF ENCODERS

(75) Inventors: Chih-Jung Liu, Taipei Hsien (TW); Chin-Hsien Ting, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 369 days.

(21) Appl. No.: 12/334,542

(22) Filed: Dec. 15, 2008

(65) Prior Publication Data

US 2010/0072939 A1 Mar. 25, 2010

(51) Int. Cl.
*G05B 1/06* (2006.01)
*G05B 1/08* (2006.01)

(52) U.S. Cl. ........ 318/656; 318/652; 318/456; 318/458; 388/819; 324/207.22; 250/231.18

(58) Field of Classification Search ................... 318/456, 318/458, 459, 463, 652, 656; 341/156; 324/207.22; 388/819; 250/231.18
See application file for complete search history.

(56) References Cited

U.S. PATENT DOCUMENTS

| | | | | |
|---|---|---|---|---|
| 5,068,529 A | * | 11/1991 | Ohno et al. | 250/231.18 |
| 6,570,350 B2 | * | 5/2003 | Ohno et al. | 388/819 |
| 6,812,694 B2 | * | 11/2004 | Uenoyama | 324/207.22 |
| 2001/0040522 A1 | * | 11/2001 | Kobayashi et al. | 341/156 |

FOREIGN PATENT DOCUMENTS

CN 1641316 A 7/2005

\* cited by examiner

*Primary Examiner* — Paul Ip
(74) *Attorney, Agent, or Firm* — Zhigang Ma

(57) ABSTRACT

A system compatible for different types of signals relates to a motor includes a differential amplifier, a comparator, and a transmitting device. The differential amplifier is configured to receive one of a differential digital pulse signals pair and a differential analog signals pair. The differential digital pulse signals pair is converted to a first digital signal, and the differential analog signals pair is converted to an analog signal by the differential amplifier. The comparator is configured to convert the analog signal into a second digital signal. The first digital signal is received and outputted by the comparator. The transmitting device is configured to convert a data signals pair to a binary code, and convert differential reference digital signals pairs to reference digital signals. The reference digital signals, the first and second digital signals are received by an external computing device.

16 Claims, 3 Drawing Sheets

US 7,969,114 B2

MOTOR DRIVING SYSTEM COMPATIBLE WITH DIFFERENT TYPES OF ENCODERS

BACKGROUND

1. Technical Field

Embodiments of the present disclosure relate to drive systems and, particularly, to a system for driving a motor and compatible for different types of encoders.

2. Description of the Related Art

Encoder devices are commonly used for motion feed back in industrial controls, such as motor controls. An encoder device translates a motor rotation information that relates to shaft position and a rotating speed into electric signals. Theses electric signals are fed to a motor driver. The motor driver is configured to process the received electric signals, and transmit the processed electric signals to a computing device, which calculates a distance result, a position result, or a speed result of the motor.

Encoder devices usually generate analog signals, digital pulse signals, or data signals, depending on the types of the encoder devices. Conventionally, a motor driver is available to encoder devices having fixed outputs, such as a sine/cosine encoder that has an analog output, an absolute encoder that outputs data signals, or an incremental encoder that outputs digital pulse signals. Therefore, multiple types of motor-drivers are needed for receiving multiple types of signals.

What is needed, therefore, is to provide a motor driving system compatible with different types of encoders to overcome the above-mentioned shortcoming.

DETAILED DESCRIPTION

Figure 1:
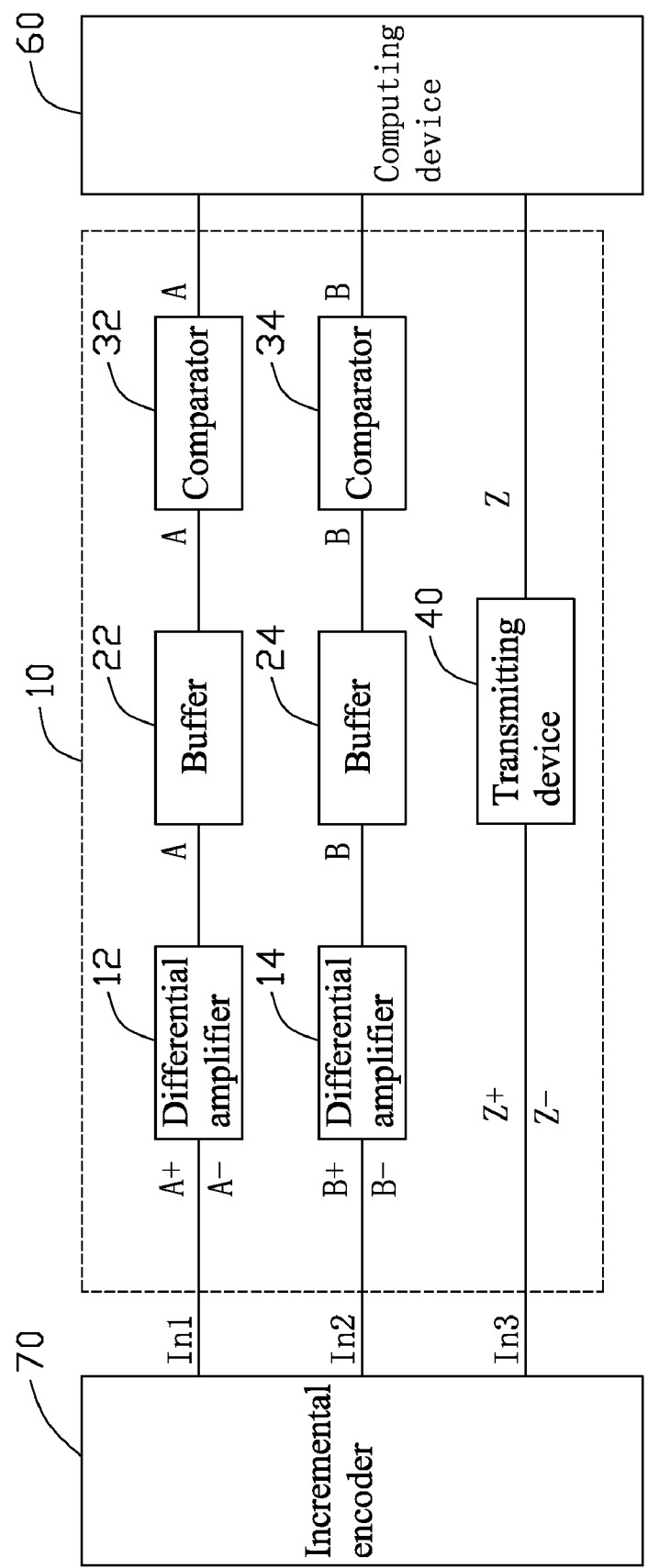
FIG. 1 is a block diagram of a first embodiment of a motor driving system connected between a first encoder device and a computing device.
Figure 2:
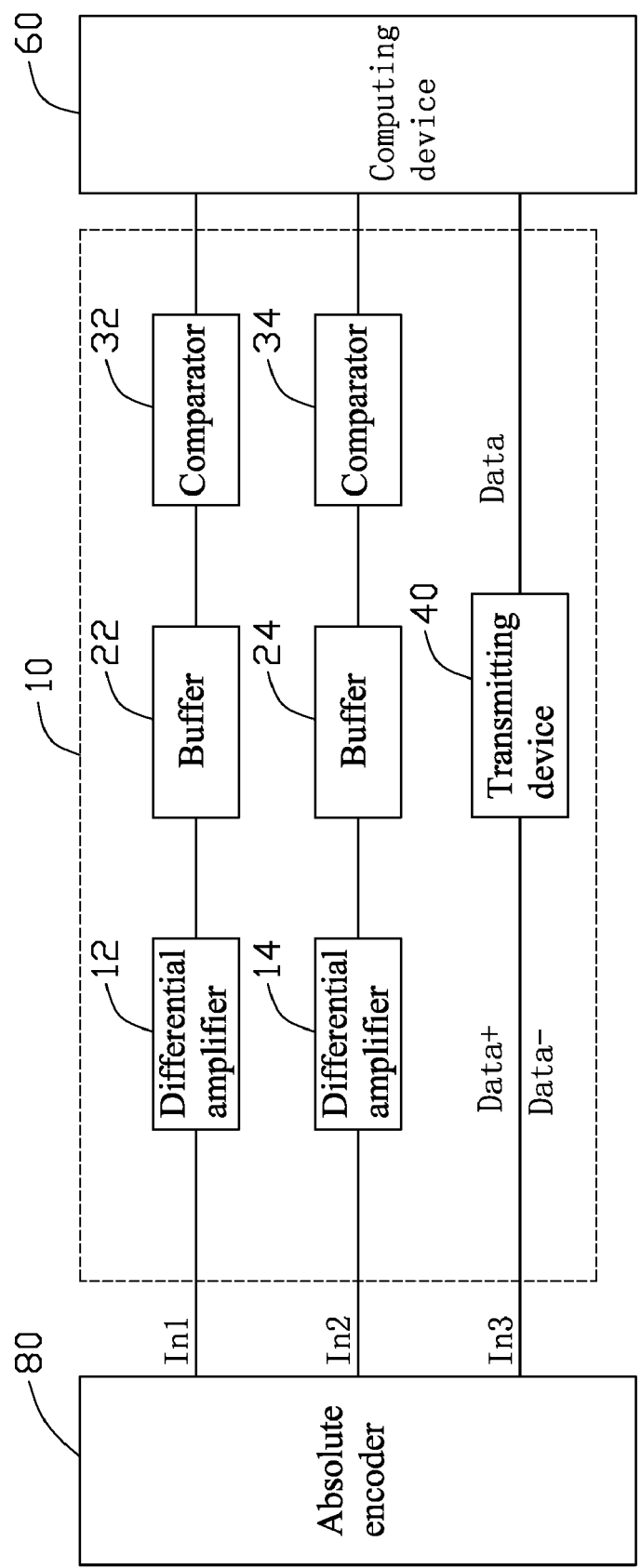
FIG. 2 is a block diagram of a second embodiment of the system connected between a second encoder device and the computing device.
Figure 3:
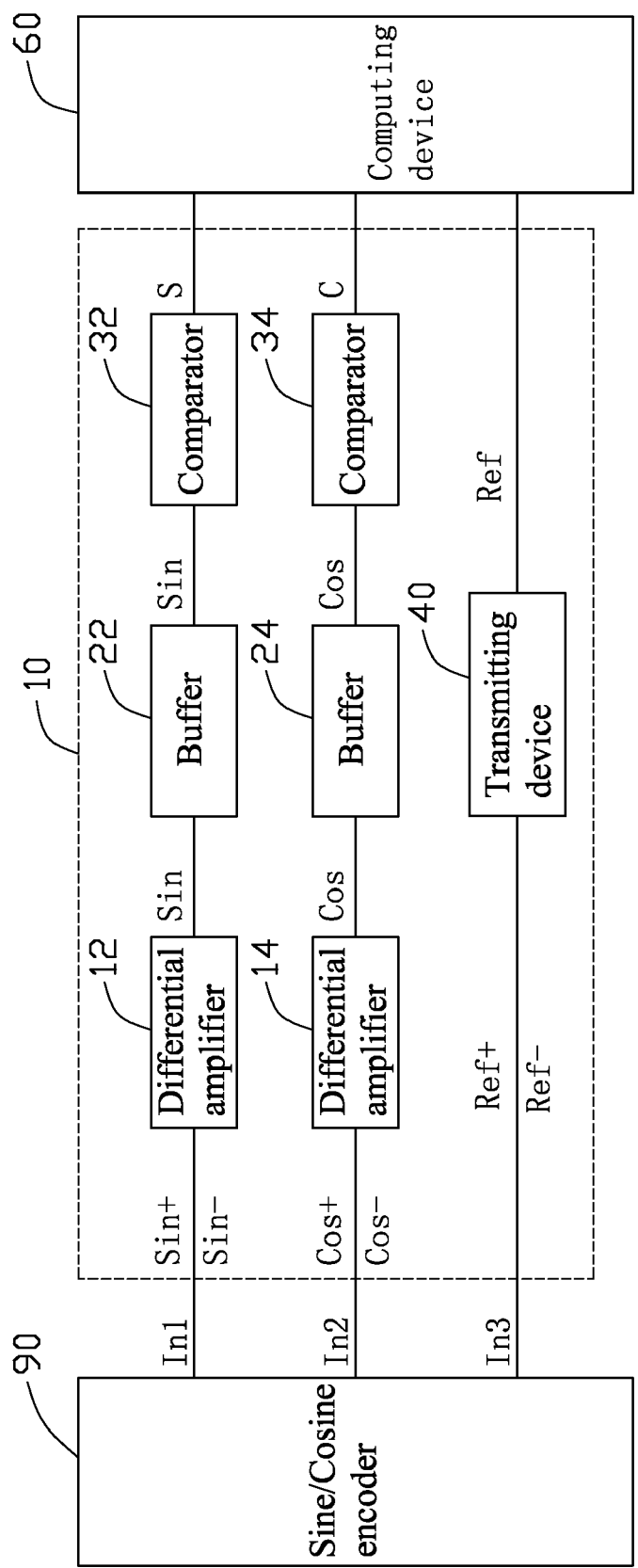
FIG. 3 is a block diagram of a third embodiment of the system connected between a third encoder device and the computing device.

Referring to FIGS. 1-3, a motor driving system 10 for driving a motor (not shown) includes two differential amplifiers 12, 14, two buffers 22, 24, two comparators 32, 34, and a transmitting device 40. The differential amplifier 12 has an input acting as an input port In1 of the system 10, and an output connected to an input of the comparator 32 via the buffer 22. The differential amplifier 14 has an input acting as an input port In2 of the system 10, and an output connected to an input of the comparator 34 via the buffer 24. The transmitting device 40 has an input acting as an input port In3 of the system 10, and an output connected to an external computing device 60. Each of the comparators 32 and 34 has an output connected to the computing device 60.

Each of the input ports In1, In2, and In3 of the system 10 is configured to be connected to a corresponding output of an encoder. The encoder may be, for example, an incremental encoder 70 as shown in FIG. 1, an absolute encoder 80 as shown in FIG. 2, or a Sine/Cosine encoder 90 as shown in FIG. 3. The input ports In1, In2, and In3 of the system 10 are available to receive output signals from the incremental encoder 70, the absolute encoder 80, and the Sine/Cosine encoder device 90 as shown in FIG. 3. The received signals may be analog signals, digital signals, or data signals, depending on the type of the encoder.

In the illustrated embodiment of FIG. 1, the incremental encoder 70 senses parameters of the motor, such as a rotating speed or a position of the motor, and generates differential digital pulse signals A+, A−, B+, B−, Z+, and Z− correspondingly. The differential digital pulse signals A+, A−, B+, B−, Z+, and Z− are transmitted in differential pairs to reduce noise. The signals A+ and A− form a first differential pair. The signals B+ and B− form a second differential pair. The signals Z+ and Z− form a third differential pair.

The signals A+ and A− are received and amplified by the differential amplifier 12. The differential amplifier 12 outputs a count pulse signal A after processing the signals A+ and A−. The count pulse signal A is received by the comparator 32 after being delayed by the buffer 22. The comparator 32 transmits the delayed count pulse signal A to the computing device 60. The signals B+ and B− are received and amplified by the differential amplifier 14, the differential amplifier 14 outputs a count pulse signal B after processing the signals B+ and B−. The count pulse signal B is received by the comparator 34 after being delayed by the buffer 24. The comparator 34 transmits the delayed count pulse signal B to the computing device 60. The signals Z+ and Z− are received and processed by the transmitting device 40. The transmitting device 40 outputs a reference digital signal Z to the computing device 60. The reference digital signal Z is configured to indicate a zero or home reference position on the encoder device 70. The rotating speed and position of the motor can be determined by counting the count pulse signals A, B, and the reference digital signal Z by the computing device 60. There is a 90 degree phase difference between the first and second differential pairs, so is between the count pulse signals A and B, such that the motion direction, for example, clockwise rotation or counterclockwise rotation of the motor is obtained. The clockwise rotation direction can be determined in response to the first differential pair being received by the system 10 prior to the second differential pair, otherwise, the counterclockwise rotation direction can be determined.

In the illustrated embodiment of FIG. 2, the absolute encoder 80 senses parameters of the motor, and only generates a pair of differential data signals Data+ and Data−. The pair of differential data signals Data+ and Data− are converted to an absolute data value Data by the transmitting device 40. The absolute data value Data is received by the computing device 60. The absolute dada value Data is in the form of a code which consists of a series of binary numbers. The computing device 60 processes the absolute data value Data to indicate the actual position of the motor.

In the illustrated embodiment of FIG. 3, the Sine/Cosine encoder 90 senses parameters of the motor, and generates a pair of differential analog signals Sin+ and Sin−, a pair of differential analog signals Cos+ and Cos−, and a pair of differential digital pulse signals Ref+ and Ref− correspondingly. The differential analog signals Sin+ and Sin− are received and amplified by the differential amplifier 12. The differential amplifier 12 outputs an analog signal Sin after processing the signals Sin+ and Sin−. The analog signal Sin is received by the comparator 32 after being delayed by the buffer 22. The comparator 32 converts the analog signal Sin into a count pulse signal S by comparing the analog signal Sin to a reference signal of the comparator 32. The count pulse signal S is transmitted to the computing device 60. The differential analog signals Cos+ and Cos− are received and amplified by the differential amplifier 14. The differential amplifier 14 outputs an analog signal Cos after processing the signals Cos+ and Cos−. The analog signal Cos is received by the comparator 34 after being delayed by the buffer 24. The comparator 34 converts the analog signal Cos into a count pulse signal C by comparing the analog signal Cos to a reference signal of the comparator 34. The count pulse signal C is transmitted to the computing device 60. The differential digital pulse signals Ref+ and Ref− are converted to a reference digital signal Ref by the transmitting device 40. The reference digital signal Ref is received by the computing device 60. The computing device 60 calculates parameters of the motor, such as the rotating speed or the position of the motor, according to the received count pulse signals S, C, and the reference digital signal Ref. The reference digital signal Ref is configured to determine the home position on the encoder device 90. There is a 90 degree phase difference between the two pairs of differential analog signals, so is between the count pulse signals S and C, such that the motion direction is obtained. It is determined that the motor is rotated in the clockwise direction in response to the signals Sin+ and Sin− being received by the system 10 prior to the a pair of differential analog signals Cos+ and Cos−, otherwise, the counterclockwise rotation direction can be determined.

Therefore, the system 10 can receive and process digital signals, analog signals, and data signals, and is workable with any of an incremental encoder, an absolute encoder, and a Sine/Cosine encoder. In the current embodiment, the buffers 22 and 24 are configured to buffer and smooth signals. In other embodiments, the buffers 22 and 24 can be omitted.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others of ordinary skills in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A motor driving system compatible with different types of signals, the system comprising:
    at least one differential amplifier configured to receive and process one of a pair of differential digital pulse signals from a first encoder, or a pair of differential analog signals from a second encoder, and output a first count pulse signal or an analog signal correspondingly;
    at least one comparator configured to transmit the first count pulse signal from the at least one differential amplifier to an external computing device, or compare the analog signal from the at least one differential amplifier with a reference signal to get a second count pulse signal and transmit the second count pulse signal to the computing device, wherein the first and second and count pulse signals are configured to indicate the speed of the motor by being counted by the computing device; and
    a transmitting device configured to convert a pair of differential reference digital signals from one of the first or second encoders which is provided to generate differential signals to the at least one differential amplifier to a reference digital signal to indicate a zero position on the encoder correspondingly, or convert a pair of data signals from a second encoder to a binary code to indicate an actual position of the motor, wherein the digital signals and the binary code are received by the computing device.

2. The system of claim 1, wherein the pair of differential digital signals and the pair of differential reference digital signals are generated by an incremental encoder.

3. The system of claim 1, wherein the pair of differential analog signals and the pair of differential reference digital signals are generated by a Sine/Cosine encoder.

4. The system of claim 1, wherein the pair of data signals are generated by an absolute encoder.

5. The system of claim 4, wherein the at least one differential amplifier comprises two differential amplifiers, each of the two differential amplifiers is configured to receive and process a pair of differential digital pulse signals, there is a 90 degree phase difference between the two pairs of differential digital pulse signals.

6. The system of claim 1, wherein the at least one differential amplifier comprises two differential amplifiers, each of the two differential amplifiers is configured to receive a pair of differential analog signals, there is a 90 degree phase difference between the two pairs of differential analog signals.

7. The system of claim 1, further comprising at least one buffer, configured to delay output signals of the at least one differential amplifier, each of the at least one differential amplifier being connected with a corresponding one of the at least one comparator via one of the at least one buffer.

8. The system of claim 1, wherein the reference signal is stored in the at least one comparator.

9. A system for driving a motor comprising:
    at least one differential amplifier capable of receiving differential digital signals from a first motor feed back device, and differential analog signals from a second motor feed back device selectively, the at least one differential amplifier is capable of outputting a first count pulse signal according to the differential digital signals, and outputting an analog signal according to the differential analog signals;
    at least one comparator capable of converting the analog signal into a second count pulse signal, and transmitting the first count pulse signal or the second count pulse signal to an external computing device; and
    a transmitting device capable of converting data signals from a third motor feed back device to a binary code and outputting the binary code to the computing device, and converting differential reference digital signals from the first feed back device or the second feed back device to a reference digital pulse signal to indicate a home position on the first feed back device or the second feed back device and outputting the reference digital signals to the computing device;
    wherein the computing device is capable of calculating parameters of the motor according to the received signals.

10. The system of claim 9, wherein the first motor feed back device is an incremental encoder, the differential digital signals comprises a pair of differential digital signals relating to motion speed of the motor.

11. The system of claim 9, wherein the second motor feed back device is a Sine/Cosine encoder, the differential analog signals comprises a pair of differential analog signals relating to motion speed of the motor.

12. The system of claim 9, wherein the third motor feed back device is an absolute encoder which generate two data signals, the data code consists of a serial of binary numbers, relating to an actual position of the motor.

13. The system of claim 9, wherein the at least one differential amplifier comprises two differential amplifiers, each of the two differential amplifiers is configured to receive a pair of differential digital signals.

14. The system of claim 13, wherein the at least one differential amplifier comprises two differential amplifiers, each of the two differential amplifiers is configured to receive a pair of differential analog signals.

15. The system of claim 9, further comprising at least one buffer, configured to delay output signals of the at least one differential amplifier, each of the at least one differential amplifier being connected with a corresponding one of the at least one comparator via one of the at least one buffer.

16. A motor driving system compatible for different types of encoders, the motor driving system comprising:

a first input port and a second configured to be connected to an encoder; wherein the first input port receives a pair of differential digital pulse signals from the encoder in response to the encoder being an incremental encoder, and a pair of differential analog signals from the encoder in response to the encoder being a Sine/Cosine encoder; wherein the second input port receives a pair of differential data signals from the encoder in response to the encoder being an absolute encoder, or a pair of differential reference digital pulse signals in response to the encoder being one of the incremental encoder and the absolute encoder;

a differential amplifier comprising an input acting as the first input port, and configured for converting the pair of differential digital pulse signals to a first count pulse signal relates to a motion speed of a motor, or converting the pair of differential analog signals to an analog signal;

a comparator configured to transmit the first count pulse signal to an external computing device, or convert the analog signal to a second count pulse signal relates to the motion speed of a motor, wherein the second count pulse signal is received by the computing device;

a transmitting device comprising an input acting as the second input port, and configured to convert the pair of differential data signals into a data value which is received by the computing device to indicate an actual position of the motor, or convert the pair of differential reference digital pulse signals to a reference digital pulse signal which is received by the computing device to indicate a zero position on the encoder.

* * * * *